(12) United States Patent
Farag

(10) Patent No.: US 10,970,445 B2
(45) Date of Patent: Apr. 6, 2021

(54) METHODS AND APPARATUS FOR PERFORMING TIMING DRIVEN HARDWARE EMULATION

(71) Applicant: Intel Corporation, Santa Clara, CA (US)

(72) Inventor: Mohamed Farag, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 15/635,951

(22) Filed: Jun. 28, 2017

(65) Prior Publication Data
US 2019/0005174 A1 Jan. 3, 2019

(51) Int. Cl.
| | |
|---|---|
| G06F 30/331 | (2020.01) |
| G06F 30/34 | (2020.01) |
| G06F 30/3312 | (2020.01) |
| G01R 31/28 | (2006.01) |

(52) U.S. Cl.
CPC ....... *G06F 30/331* (2020.01); *G01R 31/2856* (2013.01); *G01R 31/2898* (2013.01); *G06F 30/3312* (2020.01); *G06F 30/34* (2020.01)

(58) Field of Classification Search
USPC ........................................................ 716/108
See application file for complete search history.

(56) References Cited

U.S. PATENT DOCUMENTS

| | | | |
|---|---|---|---|
| 4,969,198 A | 11/1990 | Batchelder et al. | |
| 6,108,806 A | 8/2000 | Abramovici et al. | |
| 6,429,682 B1 | 8/2002 | Schultz et al. | |
| 6,817,006 B1 | 11/2004 | Wells et al. | |
| 6,891,395 B2 | 5/2005 | Wells et al. | |
| 7,036,059 B1 | 8/2006 | Carmichael et al. | |
| 7,187,597 B1 | 3/2007 | Trimberger | |
| 7,310,759 B1 | 12/2007 | Carmichael et al. | |
| 7,383,479 B1 | 6/2008 | Carmichael et al. | |
| 7,512,871 B1 | 3/2009 | Carmichael et al. | |
| 7,620,883 B1 | 11/2009 | Carmichael et al. | |
| 2004/0243953 A1* | 12/2004 | Ramachandran ... | G06F 30/3312 716/112 |
| 2008/0005710 A1* | 1/2008 | Fornaciari .......... | G06F 30/3312 716/102 |
| 2012/0017196 A1* | 1/2012 | Ng ........................ | G06F 30/327 717/104 |
| 2019/0377846 A1* | 12/2019 | Hanchinal ............... | G06F 30/34 |

OTHER PUBLICATIONS

TAN, U.S. Appl. No. 15/599,122, filed May 18, 2017.

* cited by examiner

*Primary Examiner* — Bryce M Aisaka

(57) ABSTRACT

Programmable integrated circuits may be used to perform hardware emulation of an application-specific integrated circuit (ASIC) design. The ASIC design may be loaded onto the programmable integrated circuit. During hardware emulation operations, an emulation host may be used to coordinate testing of the DUT on the programmable device. Circuit design tools may be used to extract parasitics from the ASIC design, compute low-level interconnect delays, convert the interconnect delays to higher-level port-to-port delays, convert the port-to-port delays to timing constraints, and generate corresponding configuration data for programming the programmable integrated circuit to emulate the ASIC design. The programmable integrated circuit may then be tested for functional and performance integrity.

16 Claims, 8 Drawing Sheets

METHODS AND APPARATUS FOR PERFORMING TIMING DRIVEN HARDWARE EMULATION

BACKGROUND

This relates to integrated circuits and more particularly, to programmable integrated circuits.

Programmable integrated circuits are a type of integrated circuit that can be programmed by a user to implement a desired custom logic function. In a typical scenario, a logic designer uses computer-aided design (CAD) tools to design a custom logic circuit. When the design process is complete, the computer-aided design tools generate configuration data. The configuration data is loaded into memory elements to configure the devices to perform the functions of the custom logic circuit.

In contrast to programmable integrated circuits, application-specific integrated circuits (ASICs) include hardwired circuits that are customized for a particular use rather than for general-purpose use. Since each ASIC is specifically designed for a target application, ASICs are more efficient in terms of performance and area compared to their programmable counterparts (i.e., programmable devices implementing the same target application will exhibit lower performance and larger circuit footprint).

Since ASICs have limited usage compared to general-purpose devices, each iteration of an ASIC design tends to be more costly. While it is possible to simulate an ASIC design entirely in software, it may generally be desirable to simulate the ASIC design on actual hardware before actually taping out the ASIC chip on silicon to help ensure that the ASIC design will behave as intended. This hardware simulation process is oftentimes referred to as "hardware emulation" or "ASIC emulation," which involves loading the ASIC design under test on a programmable integrated circuit. Prototyping an ASIC design on a programmable device prior to taping out can help shorten the time to market and reduce cost.

It is within this context that the embodiments described herein arise.

DETAILED DESCRIPTION

Embodiments of the present invention relate to integrated circuits and more particularly, to programmable integrated circuits that are used for hardware emulation. Circuit design tools are provided that take into account timing constraints when creating an emulation model for verifying the functionality of an application-specific integrated circuit (ASIC) design. By considering timing constraints, which can optionally be a function of operating frequency, any functional test performed on the ASIC design can not only uncover functional issues but also timing-related issues.

It will be recognized by one skilled in the art, that the present exemplary embodiments may be practiced without some or all of these specific details. In other instances, well-known operations have not been described in detail in order not to unnecessarily obscure the present embodiments.

Integrated circuits such as programmable integrated circuits use programmable memory elements to store configuration data. During programming of a programmable integrated circuit, configuration data is loaded into the memory elements. During normal operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

The programmability of such types of devices can be leveraged to help simulate the behavior of a prototype design under test (DUT). For example, it may be desirable to emulate a trial design for an application-specific integrated circuit (ASIC) on a programmable device prior to tape-out to help debug, tweak, and/or improve on the final design. This process in which a DUT is first tested on a programmable integrated circuit is sometimes referred to as ASIC emulation, ASIC prototyping, or hardware emulation.

Figure 1:
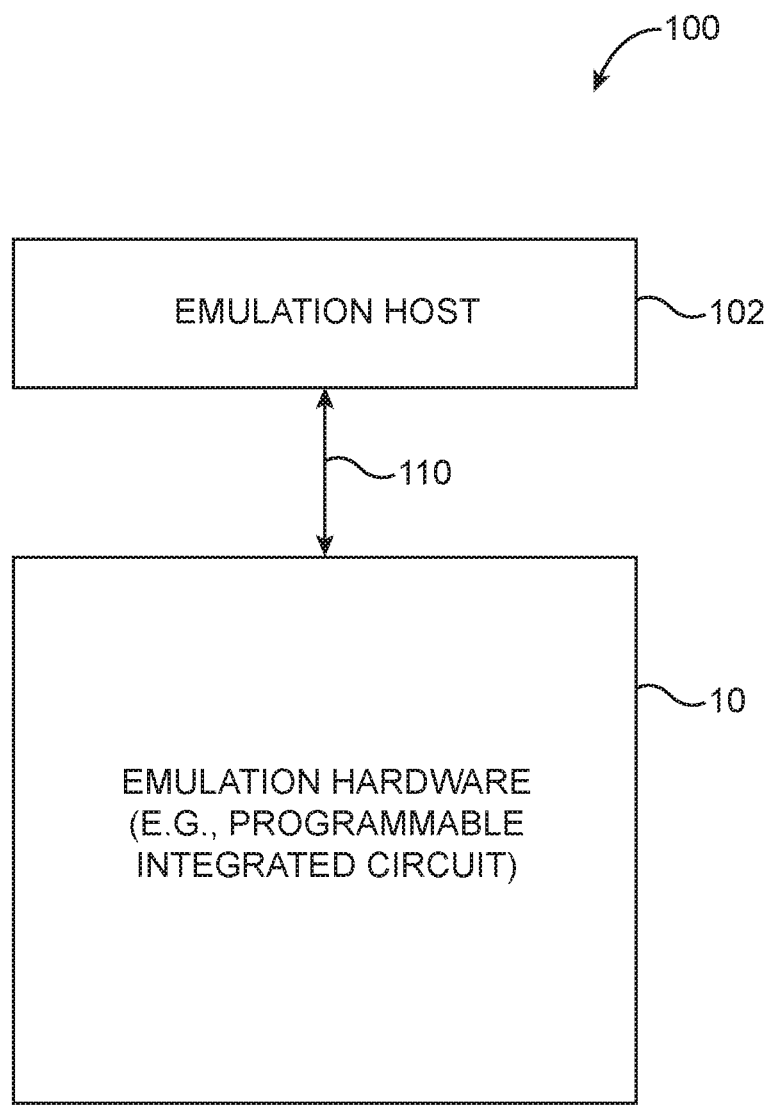
FIG. 1 is a diagram of an illustrative hardware emulation system in accordance with an embodiment.

FIG. 1 is a diagram of a hardware/ASIC emulation system such as system 100. As shown in FIG. 1, ASIC emulation system 100 may include an emulation host such as host 102 that is coupled to emulation hardware via communications path 110. The emulation hardware may, as an example, be an integrated circuit such as a programmable integrated circuit device 10. Device 10 (sometimes referred to as a programmable logic device) may include programmable circuitry, at least a portion of which can be configured as a device under test (DUT) implementing the ASIC design to be tested. Configured in this way, emulation host 102 may send commands and other control signals to emulation hardware 10 and may, in response, receive corresponding signals indicating whether or not the DUT is operating as intended.

The example described above in which emulation host 102 testes one ASIC design under test on a single programmable device 10 is merely illustrative and does not serve to limit the scope of the present embodiments. If desired, emulation host 102 may simultaneously test DUTs running on two or more programmable logic devices (PLDs) and/or test multiple DUTs running in each integrated circuit 10.

Figure 2:
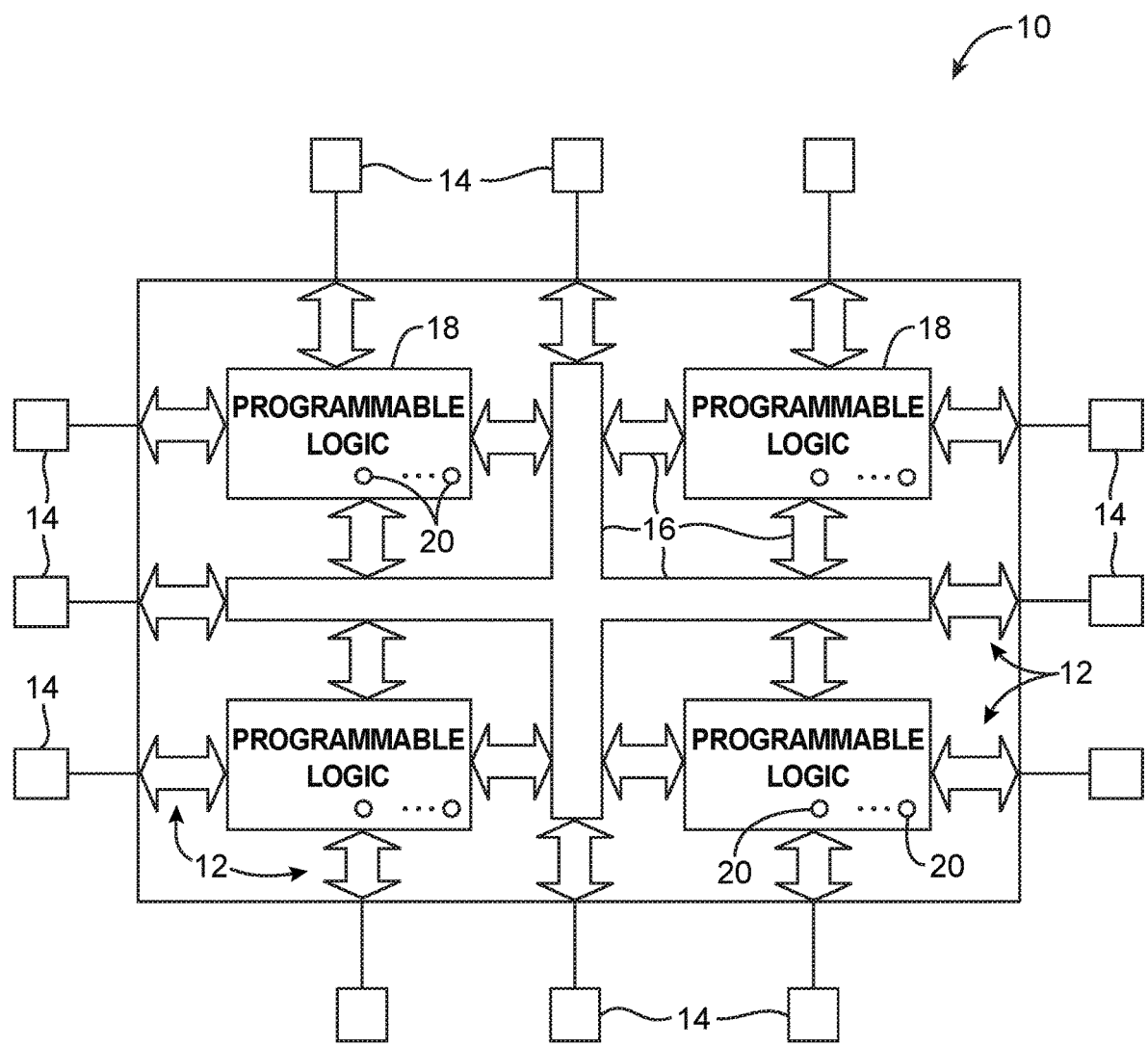
FIG. 2 is a diagram of an illustrative programmable integrated circuit in accordance with an embodiment.

FIG. 2 is a diagram of an illustrative programmable integrated circuit 10. As shown in FIG. 2, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects).

Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements each provide a corresponding static control output signal that controls the state of an associated logic component in programmable logic 18. Typically the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 3:
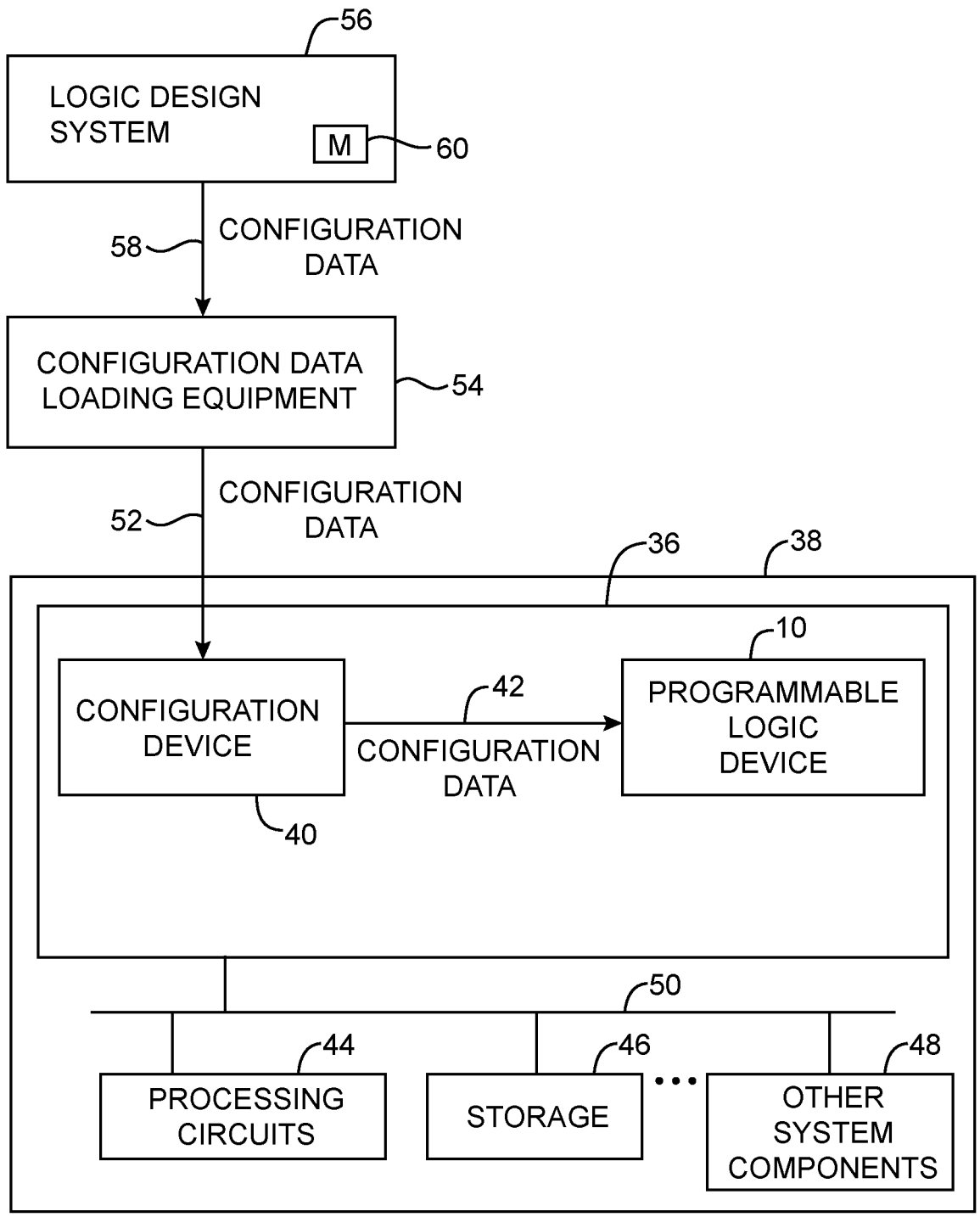
FIG. 3 is a diagram showing how configuration data is created by a logic design system and loaded into a programmable device to configure the device for operation in a system in accordance with an embodiment.

An illustrative system environment for programmable device 10 is shown in FIG. 3. Device 10 may be mounted on a board 36 in a system 38. In general, programmable logic device 10 may receive configuration data from programming equipment or from other suitable equipment or device. In the example of FIG. 3, programmable logic device 10 is the type of programmable logic device that receives configuration data from an associated integrated circuit 40. With this type of arrangement, circuit 40 may, if desired, be mounted on the same board 36 as programmable logic device 10. Circuit 40 may be an erasable-programmable read-only memory (EPROM) chip, a programmable logic device configuration data loading chip with built-in memory (sometimes referred to as a configuration device), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 3, the configuration data produced by a logic design system 56 may be provided to equipment 54 over a path such as path 58. The equipment 54 provides the configuration data to device 40, so that device 40 can later provide this configuration data to the programmable logic device 10 over path 42. System 56 may be based on one or more computers and one or more software programs. In general, software and data may be stored on any computer-readable medium (storage) in system 56 and is shown schematically as storage 60 in FIG. 3.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38. As described above in connection with FIG. 1, at least a portion of device 10 may be configured to implement a device/design under test for ASIC emulation.

Figure 4:
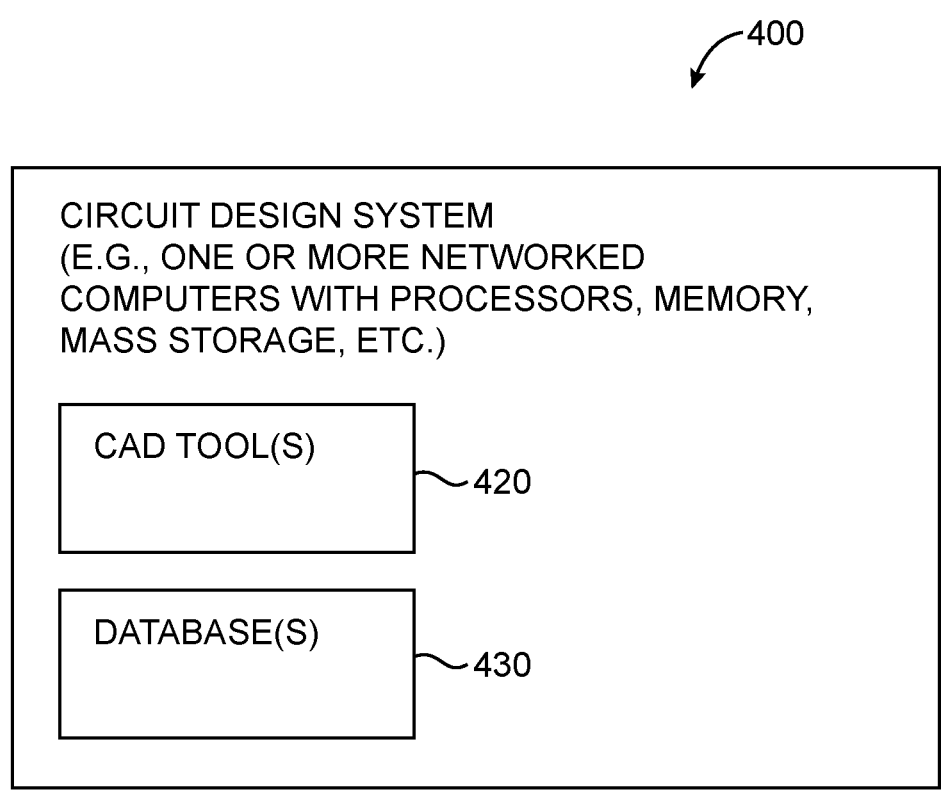
FIG. 4 is a diagram of a circuit design system that may be used to design integrated circuits in accordance with an embodiment.

FIG. 4 is a diagram of a circuit design system such as circuit design system 400 that can be used to generate configuration data for modeling an ASIC design in accordance with an embodiment. As shown in FIG. 4, circuit design system 400 may be implemented on integrated circuit design computing equipment. For example, system 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s). Software stored on the non-transitory computer readable storage media may be executed on system 400. When the software of system 400 is installed, the storage of system 400 has instructions and data that cause the computing equipment in system 400 to execute various methods (processes). When performing these processes, the computing equipment is configured to implement the functions of circuit design system 400.

The computer aided design (CAD) tools 420, some or all of which are sometimes referred to collectively as a CAD tool, a circuit design tool, or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

As described above, a hardware emulation platform can help accelerate the verification of an ASIC design's functionality. In practice, however, even if the design can functionally pass verification, it is possible for the design to still be defective due to failure to meeting certain timing requirements. Conventional techniques for performing functional verification with timing information involves performing a gate-level simulation. Gate-level simulation is not implemented on actual hardware, is time consuming for larger designs, and has limited flexibility in testing.

Figure 5:
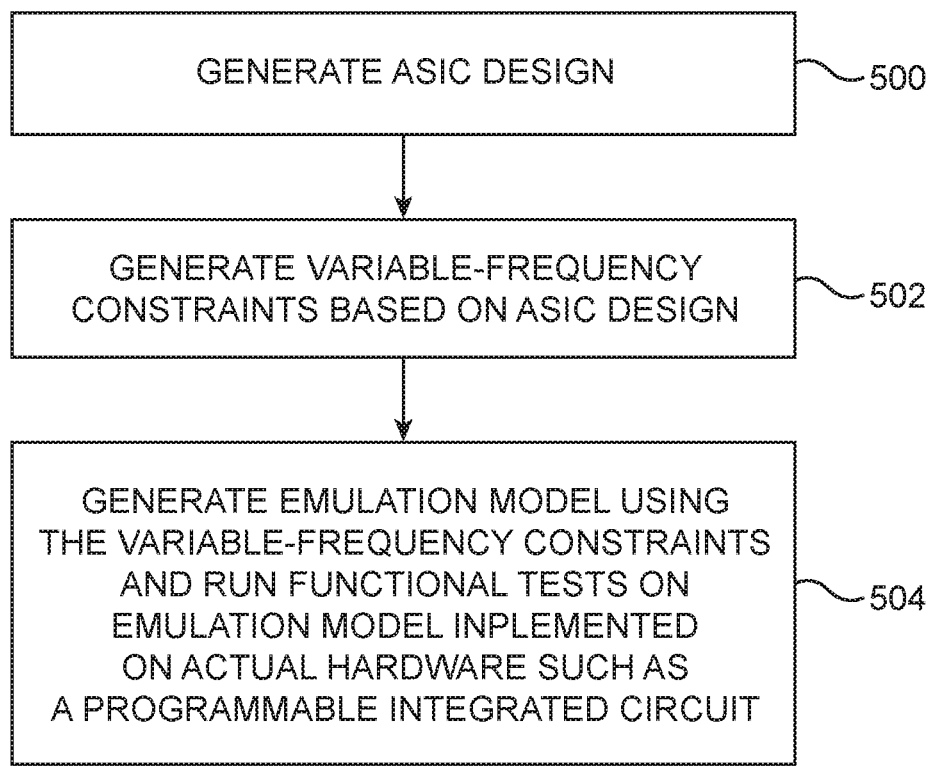
FIGS. 5 and 6 are flow charts of illustrative steps for perform timing driven hardware emulation in accordance with an embodiment.

In accordance with an embodiment, circuit design tools (e.g., tools 420 implemented on system 400 of FIG. 4) are provided that is capable of accelerating functional testing while taking into account timing information during the hardware emulation flow. FIG. 5 is a diagram showing an overall flow for performing timing-driven hardware emulation. At step 500, the circuit design tools may be used to generate an ASIC design. The ASIC design may represent a design under test that the user would like to verify the functionality and the timing using the emulation platform.

At step 502, the circuit design tools may generate variable-frequency timing constraints based on the ASIC design generated from step 500. The variable-frequency timing constraints are variable in the sense that the timing constraints will scale according to the limits of the emulation model. For example, consider a scenario in which the ASIC design has a target operating frequency of 100 MHz and limits the delay from point A to point B in the ASIC design to 10 ns. If the corresponding emulation model implemented on the programmable device is only capable of operating at a maximum operating frequency of 20 MHz (which is five times slower), the corresponding timing constraint from point A to point B in the emulated design will be scaled up to 50 ns (i.e., 10 ns multiplied by an upscaling factor of 5).

At step 504, the circuit design tools may generate a corresponding emulation model using the variable-frequency timing constraints and run functional tests on the emulation model. The emulation model may be implemented on actual emulation hardware such as programmable integrated circuit die 10 (FIG. 2). For example, the circuit design tools may generate configuration data in the form of a configuration bit stream for programming device 10 so that the logic circuits on device 10 correctly emulate the function and timing characteristics of the ASIC design. If device 10 programmed in this way can pass functional and performance criteria, then the ASIC design being emulated will likely operate as intended when taped out on actual silicon.

Figure 6:
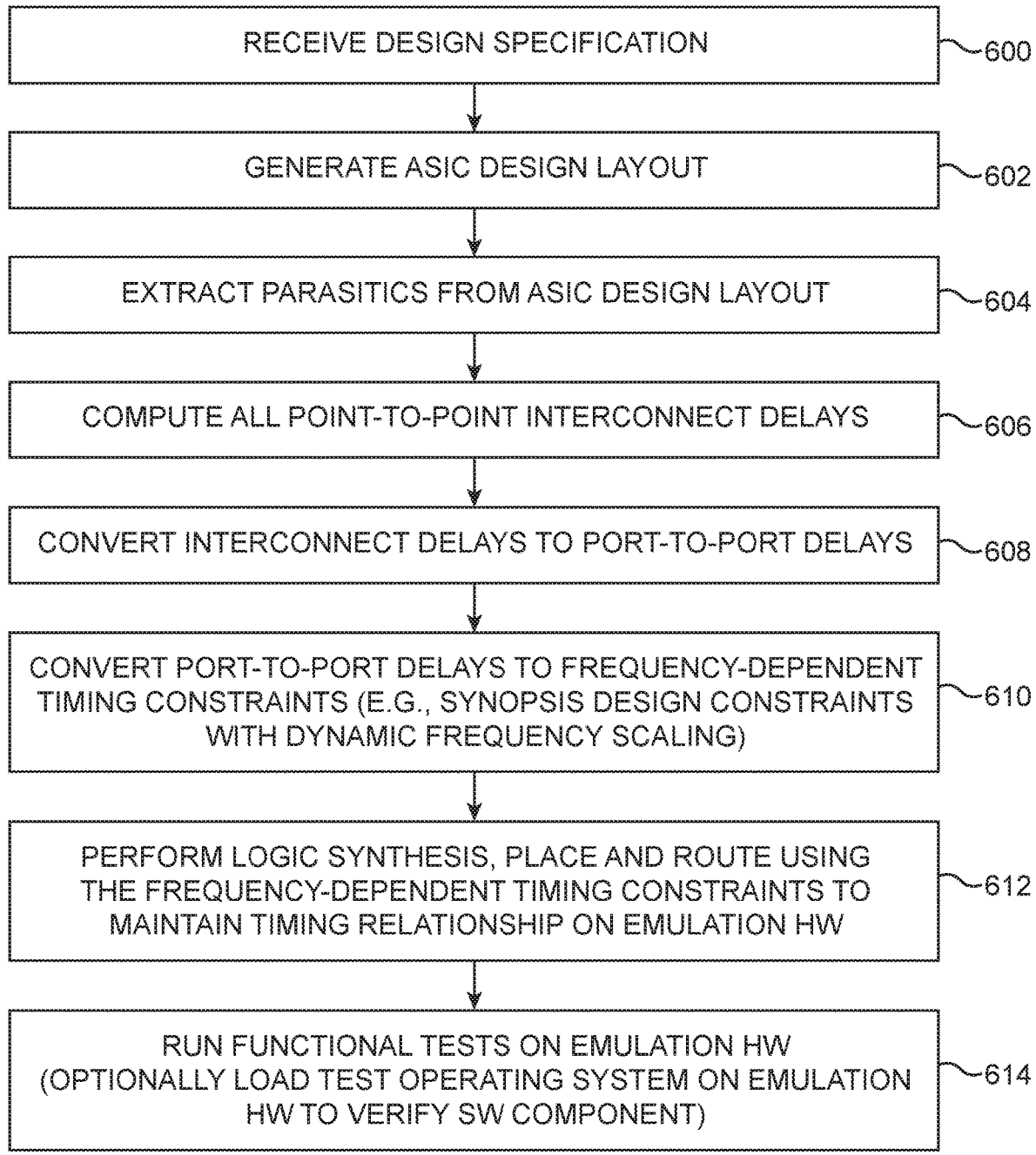

Designing an ASIC in this way can therefore provide technical advantages and improvements, which include catching timing bugs that might have been missed during an earlier design phase, running functional tests at higher speeds with timing considerations already built-in, and also providing greater confidence in the ASIC design before actual production. This process may therefore save the designer substantial time and cost associated with verifying the functionality and performance of an integrated circuit. FIG. 6 is a flow chart showing more detailed steps for performing timing-driven emulation. At step 600, circuit design tools 420 may receive a design specification (e.g., a design of an ASIC with associated design and performance criteria). At step 602, circuit design tools 420 may be used to generate a corresponding ASIC design layout for the ASIC design. The ASIC design layout may be a software representation indicating where each circuit and interconnect should be formed on a semiconductor substrate.

At step 604, tools 420 may be used to extract parasitic components from the ASIC design layout. For example, tools 420 may analyze the proximity of adjacent conductive components and the length/width of each conducting segment to extract parasitic capacitance, inductance, and resistance which are introduced as a function of that particular layout. The parasitic components may represent additional passive electrical components which are not explicitly spelled out in the original design specification.

Figure 7A:
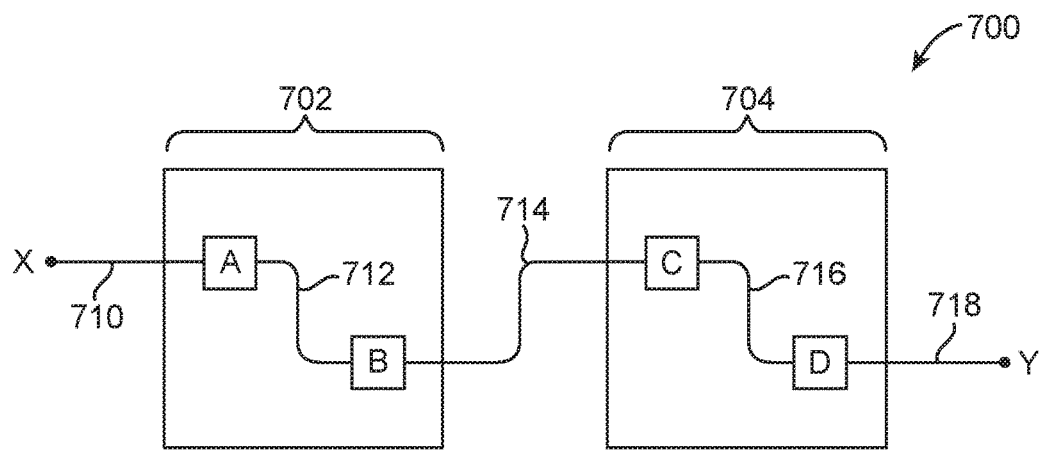
FIG. 7A is a diagram illustrating point-to-point interconnect delays in a circuit design in accordance with an embodiment.

At step 606, tools 420 may be used to compute all "point-to-point" interconnect delays. FIG. 7A is a diagram illustrating the definition of point-to-point interconnect delays in a circuit design such as ASIC design 700. As shown in FIG. 7A, ASIC design 700 may include a first port X, a second port Y, a first circuit 702 coupled to port X, and a second circuit 704 coupled between circuit 702 and port Y. Circuit 702 includes sub-circuits A and B, whereas circuit 704 includes sub-circuits C and D. Sub-circuits A, B, C, and D may represent standard cells selected from a standard cell library, which provide assistance to the circuit designer for entering (specifying) certain circuit blocks when creating the ASIC design.

In particular, wire 710 connects port X to the input of sub-circuit A. Wire 712 connects sub-circuit A to sub-circuit B. Wire 714 connects sub-circuit B to sub-circuit C. Wire 716 connects sub-circuit C to sub-circuit D. Wire 718 connects sub-circuit D to port Y. Point-to-point interconnect delays are the delays of each of these wires 710-718. Computing the delay of each of these wires while taking into account any extracted parasitics is most accurate and represents the lowest level of abstraction.

Analyzing delays for each individual wire in such high level of granularity may, however, be too cumbersome for the emulation platform. As a result, circuit design tools 420 may be configured to convert the point-to-point interconnect delays to "port-to-port" delays, which represent the timing parameters using a higher level of abstraction (see, e.g., step 608 in FIG. 6).

Figure 7B:
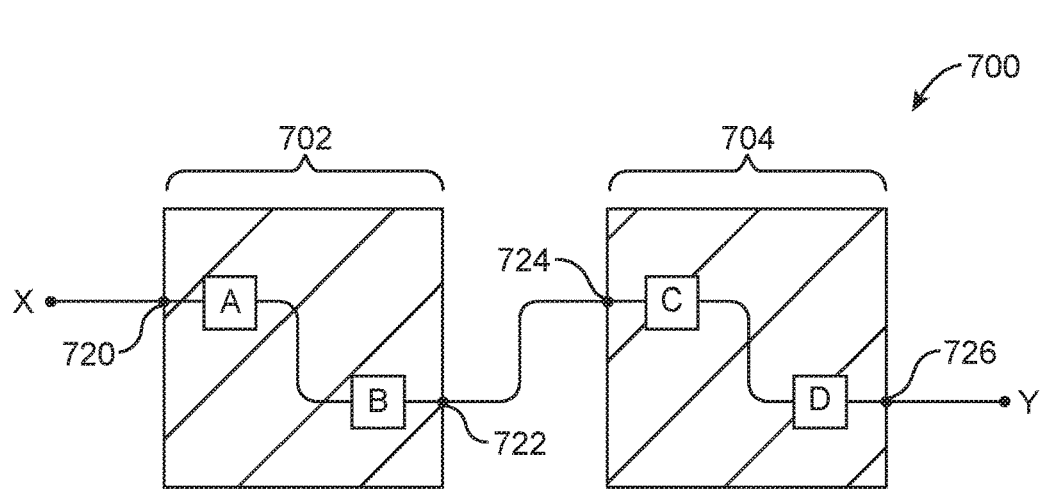
FIGS. 7B and 7C are diagrams illustrating port-to-port delays in a circuit design in accordance with an embodiment.

FIG. 7B is a diagram illustrating the definition of port-to-port delays in ASIC design 700. As shown in FIG. 7B, circuit block 702 has ports 720 and 722, whereas circuit block 704 has ports 724 and 726. The delay from port X to port 720 represents a first port-to-port delay. The delay from port 720 to port 722 is an "intra-block" delay (i.e., the delay from the input port of a given block to its own output port) and represents a second port-to-port delay. The delay from port 722 to port 724 is an "inter-block" delay (i.e., the delay from one circuit block to another) and represents a third port-to-port delay. The delay from port 724 to port 726 is another intra-block delay and represents a fourth port-to-port delay. Lastly, the delay from port 726 to port Y represents a fifth port-to-port delay.

In the example of FIG. 7B, there are five port-to-port delays. By comparison, the number of point-to-point delays described in connection with FIG. 7A is also equal to five. If, however, each of circuits 702 and 704 includes at least three series-connected sub-circuits, the number of point-to-point interconnect delays would increase to at least seven. Even if the each of circuits 702 and 704 includes three series-connected sub-circuits, the number of port-to-port delays will remain constant at five because we no longer care about the number of individual connections within each circuit block (as indicated by shaded region in FIG. 7B). Converting point-to-point interconnect delays to port-to-port delays therefore provides a higher level of abstraction, which simplifies the circuit design flow as the number of components being abstracted out increases (e.g., as the number of sub-circuits being lumped together or aggregated goes up).

Figure 7C:
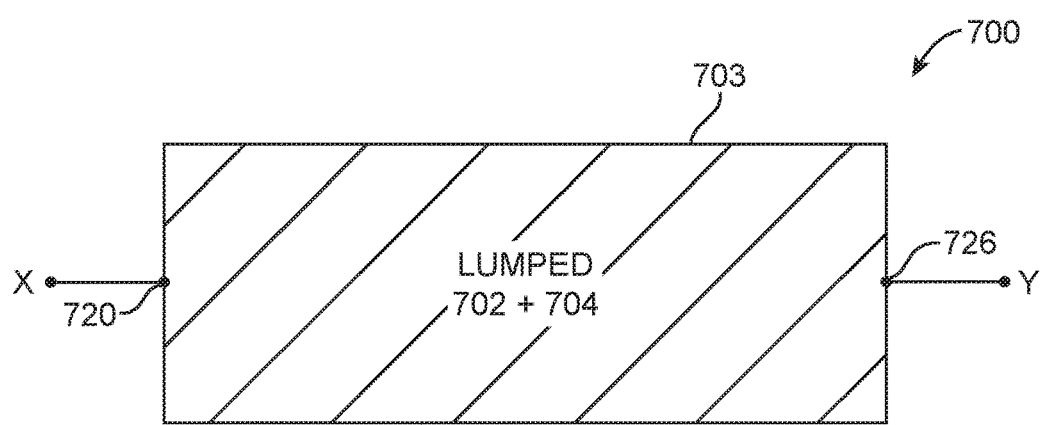

FIG. 7C illustrates an even higher level of abstraction that can be used to represent ASIC design 700. As shown in FIG. 7C, all circuit components between port 720 and port 726 may be lumped into a single block 703. As a result, there will only be three remaining port-to-port delays: (1) the delay between port X and port 720, (2) the delay between port 720 and port 726, which is a single number that represents all point-to-point delays between ports 720 and 726, and (3) the delay between port 726 and port Y. If desired, ASIC design 700 may be further abstracted to only one port-to-port delay, which is a single number that represents the aggregated delay between port X and port Y.

Figure 8:
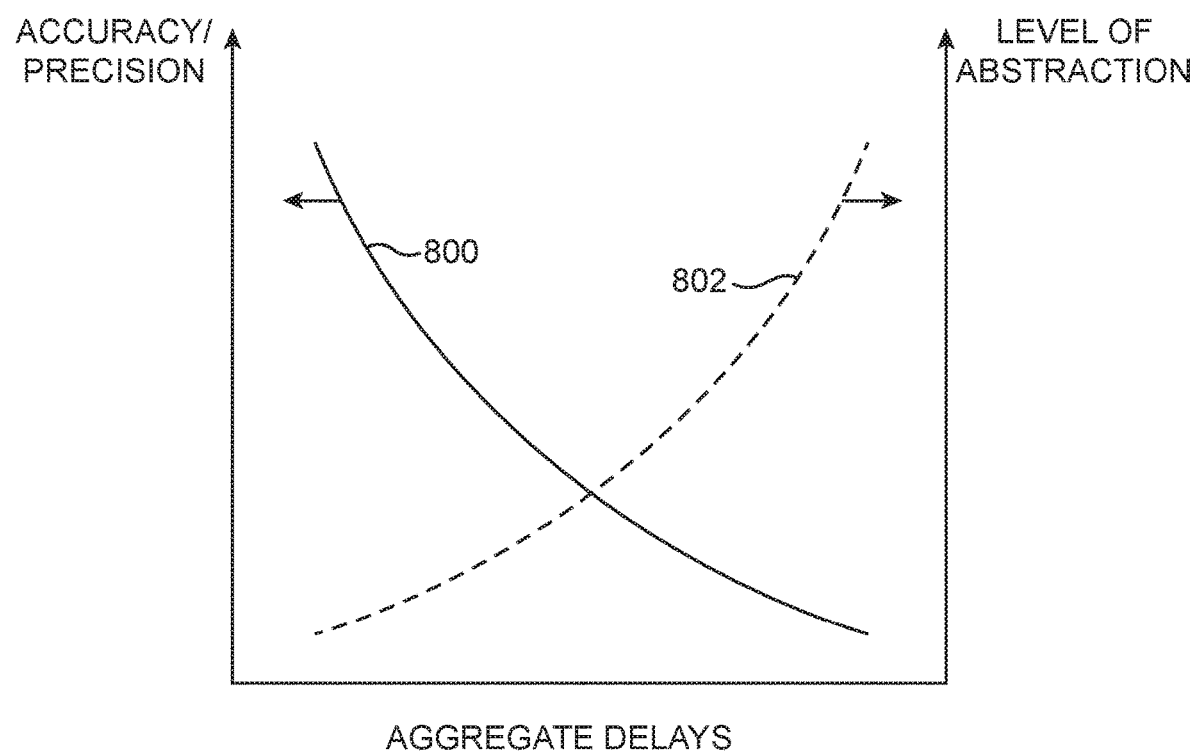
FIG. 8 is a diagram plotting emulation accuracy against the level of aggregate delays in accordance with an embodiment.

FIG. 8 is a graph plotting emulation accuracy versus the number of aggregate delays. In particular, curve 800 represents the accuracy and/or precision of the emulated model relative to the actual ASIC design, whereas curve represents the level of abstraction. As shown in FIG. 8, the level of abstraction goes up as the number of aggregate delays is increased (see trajectory of curve 802). When the number of aggregate delay is increased, however, the accuracy and precision of the emulation decreases (see trajectory of curve 800). In other words, this process trades off between emulation accuracy/precision with emulation complexity. In general, any desired hierarchy of abstraction may be utilized to help streamline hardware emulation verification while maintaining sufficient accuracy.

Referring back to FIG. 6, once the port-to-port delays have been obtained, circuit design tools 420 can then convert the port-to-port delays to frequency-dependent timing constraints (step 610). These adjustable timing constraints may be a function of the target ASIC frequency and the actual frequency attainable by the emulated design (i.e., the maximum achievable operating frequency of the emulation hardware). A scaling factor F may be used to adjust the timing constraints as needed when the emulated design cannot operate at the target ASIC frequency.

For example, consider a scenario in which the target ASIC frequency is equal to 200 MHz, with a given port-to-port delay between ports X and Y in the ASIC design limited to 50 ns. The corresponding timing constraint may be expressed in code as "set max delay from(X) to (Y)=10 ns*F", where F is equal to the ratio of the target ASIC frequency to the attainable frequency of the programmable device implementing the hardware emulation. This syntax is merely illustrative. In general, timing constraints may be encoded using the Synopsis Design Constraint (SDC) format or other suitable representations. Thus, if the programmable emulation device can only operate at 100 MHz when prototyping the ASIC design, then the corresponding timing constraint for the port-to-port delay between X and Y will be set to 10 ns*(200/100), which is equal to 20 ns. Variable frequency timing constraints for each port-to-port connection may be obtained using this approach.

At step 612, circuit design tools 420 may be used to perform logic synthesis and place and route operations using the frequency-dependent timing constraints to help maintain timing relationships for the emulation hardware. For example, the standard cells in the ASIC design may be implemented using lookup table (LUT) circuits or other programmable logic circuitry on device 10. Tools 420 should ensure that the port-to-port delays from one LUT port to another satisfies the timing constraints. Tools 420 may generate configuration data, which can be loaded onto programmable device 10 for emulating the ASIC design on actual hardware.

At step 614, device 10 configured to implement the ASIC design under test may be operated to perform functional testing to verify behavioral characteristics while ensuring all timing constraints are satisfied. Moreover, emulating the ASIC design on actual hardware such as a programmable device can provide more flexibility by allowing a test operating system (OS) to be loaded onto the emulation hardware. Testing the operating system or other software component is particularly challenging in gate-level simulation. Running a test software on actual emulation hardware can help verify compatibility of the test software with the ASIC design and uncover any potential issues before silicon production, thereby saving time and cost.

These steps are merely illustrative. The existing steps may be modified or omitted; some of the steps may be performed in parallel; additional steps may be added; and the order of certain steps may be reversed or altered. The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

EXAMPLES

The following examples pertain to further embodiments.

Example 1 is a method of implementing an integrated circuit using circuit design tools, the method comprising: generating a first circuit design; generating timing constraints based on the first circuit design; and generating a second circuit design based on the timing constraints, wherein the second circuit design emulates the first circuit design on the integrated circuit.

Example 2 is the method of example 1, wherein the first circuit design is optionally an application-specific integrated circuit (ASIC) design.

Example 3 is the method of example 2, optionally further comprising: generating configuration data based on the second circuit design; and loading the configuration data into the integrated circuit.

Example 4 is the method of example 1, wherein generating the timing constraints optionally comprises generating frequency-dependent timing constraints.

Example 5 is the method of example 4, wherein the first circuit design has a target operating frequency, wherein the second circuit design has a maximum achievable frequency that is less than the target operating frequency, and wherein the frequency-dependent timing constraint is optionally a function of the ratio of the target operating frequency of the first circuit design to the maximum achievable operating frequency of the second circuit design.

Example 6 is the method of example 1, optionally further comprising: extracting parasitics from the first circuit design; and computing point-to-point interconnect delays using the extracted parasitics.

Example 7 is the method of example 6, optionally further comprising: converting the point-to-point interconnect delays to port-to-port delays; and converting the port-to-port delays to the timing constraints.

Example 8 is the method of any one of examples 1-7, optionally further comprising: running functional tests on the integrated circuit to verify that the first circuit design satisfies design criteria.

Example 9 is the method of any one of examples 1-7, optionally further comprising: loading a test operating system into the integrated circuit to verify that the test operating system satisfies design criteria.

Example 10 is a non-transitory computer-readable storage medium comprising instructions for: generating an application-specific integrated circuit (ASIC) design; generating timing information associated with the ASIC design; and generating an emulation design using the timing information.

Example 11 is the non-transitory computer-readable storage medium of example 10, optionally further comprising instructions for: generating a layout of the ASIC design; and extracting parasitics from the layout of the ASIC design.

Example 12 is the non-transitory computer-readable storage medium of example 11, optionally further comprising instructions for: computing delay based on the extracted parasitics.

Example 13 is the non-transitory computer-readable storage medium of example 12, wherein the instructions for computing the delay optionally comprises instructions for: computing a first type of delay; and converting the first type of delay to a second type of delay that is different than the first type of delay.

Example 14 is the non-transitory computer-readable storage medium of example 13, wherein the instructions for generating the timing information optionally further comprises instructions for converting the second type of delay into frequency-dependent timing constraints.

Example 15 is the non-transitory computer-readable storage medium of any one of examples 10-14, optionally further comprising instructions for: implementing the emulation design on a programmable integrated circuit to verify that the ASIC design satisfies design criteria.

Example 16 is an integrated circuit, comprising: programmable circuitry configured using a logic design that is generated based on an application-specific integrated circuit (ASIC) design and timing constraints associated with the ASIC design, wherein the logic design emulates the ASIC design on the integrated circuit.

Example 17 is the integrated circuit of example 16, wherein the timing constraints comprises frequency-dependent timing constraints.

Example 18 is the integrated circuit of example 17, wherein the ASIC design has a target operating frequency, wherein the logic design has a maximum achievable operating frequency that is less than the target operating frequency, and wherein the frequency-dependent timing constraints are a function of the ratio of the target operating frequency to the maximum achievable operating frequency.

Example 19 is the integrated circuit of example 18, wherein the timing constraints are computed based on parasitics extracted from the ASIC design, a first type of delay computed from the extracted parasitics, and a second type of delay that is converted from the first type of delay.

Example 20 is the integrated circuit of any one of examples 16-20, wherein the programmable circuit is further configured using a test operating system to determine whether the test operating system is compatible with the ASIC design.

Example 21 is an integrated circuit emulation system, comprising: means for generating a first design; means for generating timing constraints from the first design; means for generating a second design from the timing constraints; and means for implementing the second design on a programmable integrated circuit to verify functionality of the first design.

Example 22 is the integrated circuit emulation system of example 21, wherein the means for generating the timing constraints comprises: means for extracting parasitics from the first design; and means for computing a first type of delay based on the extracted parasitics, wherein the first type of delay has a first level of abstraction.

Example 23 is the integrated circuit emulation system of example 22, wherein the means for generating the timing constraints further comprises means for converting the first type of delay into a second type of delay having a second level of abstraction that is higher than the first level of abstraction.

Example 24 is the integrated circuit emulation system of example 23, wherein the means for generating the timing constraints further comprises converting the second type of delay into adjustable timing constraints.

Example 25 is the integrated circuit emulation system of any one of examples 21-24, further comprising means for loading test software onto the programmable integrated circuit to verify compatibility of the test software with the first design.

For instance, all optional features of the apparatus described above may also be implemented with respect to the method or process described herein. The foregoing is merely illustrative of the principles of this disclosure and various modifications can be made by those skilled in the art.

What is claimed is:

1. A method of implementing an integrated circuit using circuit design tools, the method comprising:
   generating a first circuit design having a target operating frequency;
   generating frequency-dependent timing constraints based on the first circuit design; and
   generating, based on the frequency-dependent timing constraints, a second circuit design having a maximum achievable operating frequency less than the target operating frequency, wherein the second circuit design emulates the first circuit design on the integrated circuit and wherein the frequency-dependent timing constraints are a function of a ratio of the target operating frequency and the maximum achievable operating frequency.

2. The method of claim 1, wherein the first circuit design is an application-specific integrated circuit (ASIC) design.

3. The method of claim 2, further comprising:
generating configuration data based on the second circuit design; and
loading the configuration data into the integrated circuit.

4. The method of claim 1, further comprising:
extracting parasitics from the first circuit design; and
computing point-to-point interconnect delays using the extracted parasitics.

5. The method of claim 4, further comprising:
converting the point-to-point interconnect delays to port-to-port delays; and
converting the port-to-port delays to the timing constraints.

6. The method of claim 1, further comprising:
running functional tests on the integrated circuit to verify that the first circuit design satisfies design criteria.

7. The method of claim 1, further comprising:
loading a test operating system into the integrated circuit to verify that the test operating system satisfies design criteria.

8. A non-transitory computer-readable storage medium comprising instructions for:
generating an application-specific integrated circuit (ASIC) design;
generating timing information associated with the ASIC design by generating a layout of the ASIC design, extracting parasitics from the layout, computing a first type of delay based on the extracted parasitics, and converting the first type of delay to a second type of delay that is different than the first type of delay; and
generating an emulation design using the timing information.

9. The non-transitory computer-readable storage medium of claim 8, wherein the instructions for generating the timing information further comprises instructions for converting the second type of delay into frequency-dependent timing constraints.

10. The non-transitory computer-readable storage medium of claim 8, further comprising instructions for:
implementing the emulation design on a programmable integrated circuit to verify that the ASIC design satisfies design criteria.

11. A programmable integrated circuit, comprising:
programmable logic circuitry configured using a programmable logic design that is generated using an application-specific integrated circuit (ASIC) design and timing constraints of the ASIC design, wherein the programmable logic design emulates the ASIC design on the programmable integrated circuit.

12. The programmable integrated circuit of claim 11, wherein the timing constraints comprises frequency-dependent timing constraints.

13. The programmable integrated circuit of claim 12, wherein the ASIC design has a target operating frequency, wherein the programmable logic design has a maximum achievable operating frequency that is less than the target operating frequency, and wherein the frequency-dependent timing constraints are a function of the ratio of the target operating frequency to the maximum achievable operating frequency.

14. The programmable integrated circuit of claim 13, wherein the timing constraints are computed based on parasitics extracted from the ASIC design, a first type of delay computed from the extracted parasitics, and a second type of delay that is converted from the first type of delay.

15. The programmable integrated circuit of claim 11, wherein the programmable logic circuitry is further configured using a test operating system to determine whether the test operating system is compatible with the ASIC design.

16. The programmable integrated circuit of claim 11, wherein the programmable logic circuitry comprises field-programmable gate array circuitry.

* * * * *